United States Patent [19]
Lee et al.

[11] 3,741,415
[45] June 26, 1973

[54] VEHICLE CARRYING AN IMPLEMENT

[75] Inventors: Lewis R. Lee, Basildon; Robert S. D. Whybro, Hullbridge; William A. Bennett, Hornchurch, all of England

[73] Assignee: Ford Motor Company, Dearborn, Mich.

[22] Filed: Feb. 10, 1972

[21] Appl. No.: 225,081

[52] U.S. Cl. .............................. 214/138 C, 214/730
[51] Int. Cl. ................................................ B66f 9/00
[58] Field of Search .................... 214/138 R, 138 C, 214/730; 280/456

[56] References Cited
UNITED STATES PATENTS
3,263,837  8/1966  Noller ............................ 214/138 C FOREIGN PATENTS OR APPLICATIONS
2,006,986  1/1970  France ............................ 214/138 C Primary Examiner—Gerald M. Forlenza
Assistant Examiner—John Mannix
Attorney—Keith L. Zerschling, Peter F. Hilder et al.

[57] ABSTRACT

A carriage is disclosed to be attached to the rear of a tractor for supporting a backhoe. The carriage is slidably mounted on a transversely extending slideway and locked by one or more levers which are pivotally mounted on the carriage and rockable to engage the slideway.

4 Claims, 5 Drawing Figures

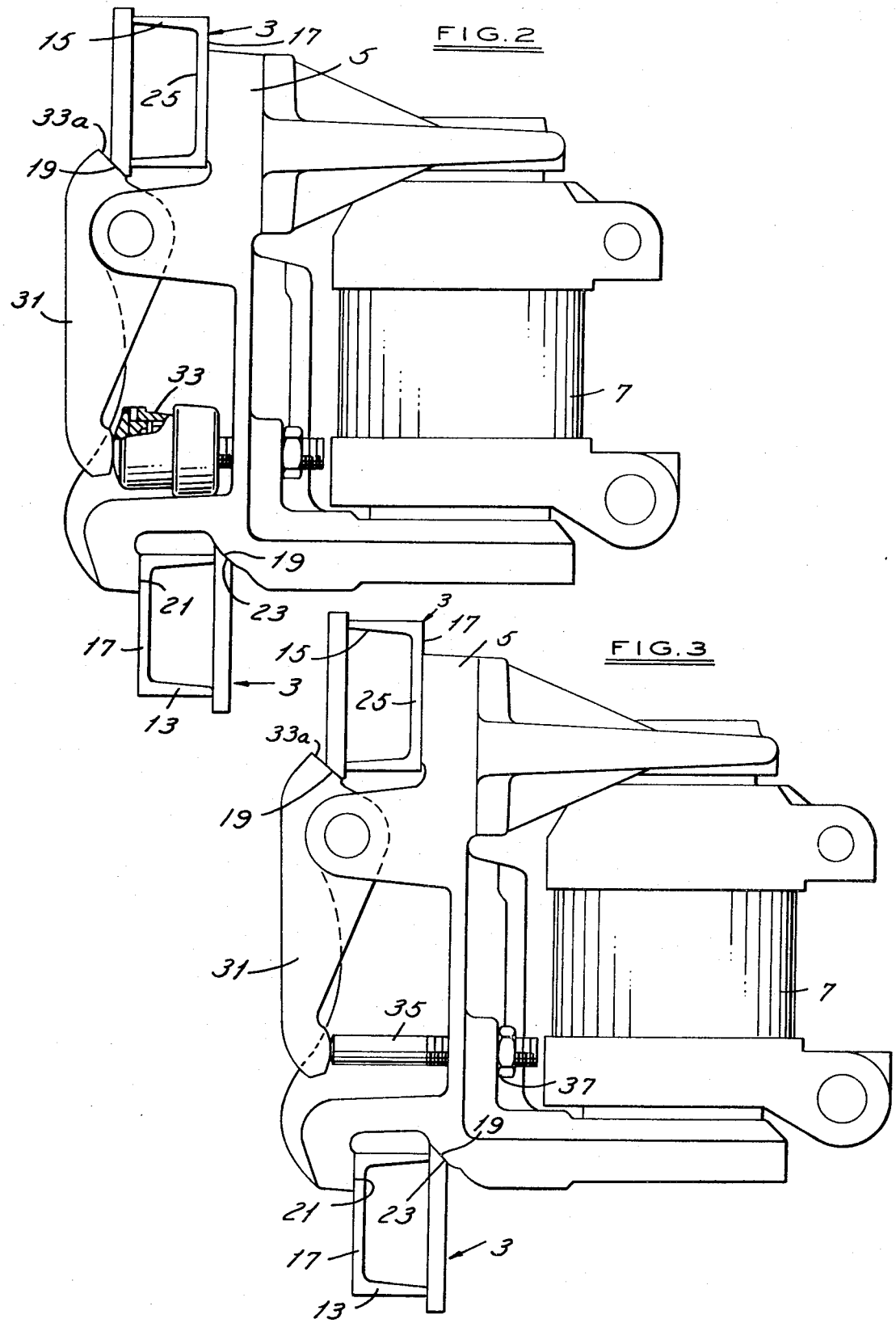

VEHICLE CARRYING AN IMPLEMENT

This invention relates to vehicles carrying implements; for example, a tractor fitted with a backhoe.

A backhoe of the type fitted on tractors may be carried by a carriage slidably mounted on a transversely extending slideway formed by a frame fitted at the rear of the tractor. The carriage can be clamped to the frame to prevent it from sliding along the slideway. This invention is concerned with an arrangement for clamping the carriage to the frame.

In a vehicle according to this invention:
a. there is a frame having a transversely extending slideway;
b. a carriage carrying an implement such as a backhoe is slidably mounted on the slideway and is slideable on the frame from one side of the vehicle to other;
c. one or more levers pivotally mounted on the carriage are rockable to engage the frame and thereby to clamp the carriage to the frame.

Preferably, the slideway comprises parallel and vertically spaced apart first and second rail sections; each section has a vertical surface and a surface inclined to the vertical; the carriage has surfaces corresponding to the vertical surfaces and the inclined surface of the lower or second section; the lever, when rocked to clamp the carriage, engages the inclined surface of the first section; and the inclination of the inclined surfaces and disposition of the vertical surfaces is such that, upon the lever engaging the inclined surface of the first section, the carriage is forced vertically against the inclined surface of the second section to the carriage force the vertical surfaces of the carriage against the vertical surfaces of the slideway and thus firmly clamp the carriage to the slideway.

Preferably, the levers, when rocked to clamp the carriage, force the carriage downwardly.

Among the objects of the present invention are to provide an improved clamp for locking adjustable offset backhoes on a slideway; to provide such a clamp which is simple and dependable in operation.

The invention is hereinafter particularly described with reference to the accompanying drawings in which:

FIG. 2 is a side elevation of the carriage, swing motor and slideways of a backhoe;

FIG. 3 is an elevation similar to that of FIG. 2 of a modified form of carriage clamp;

Figure 1:
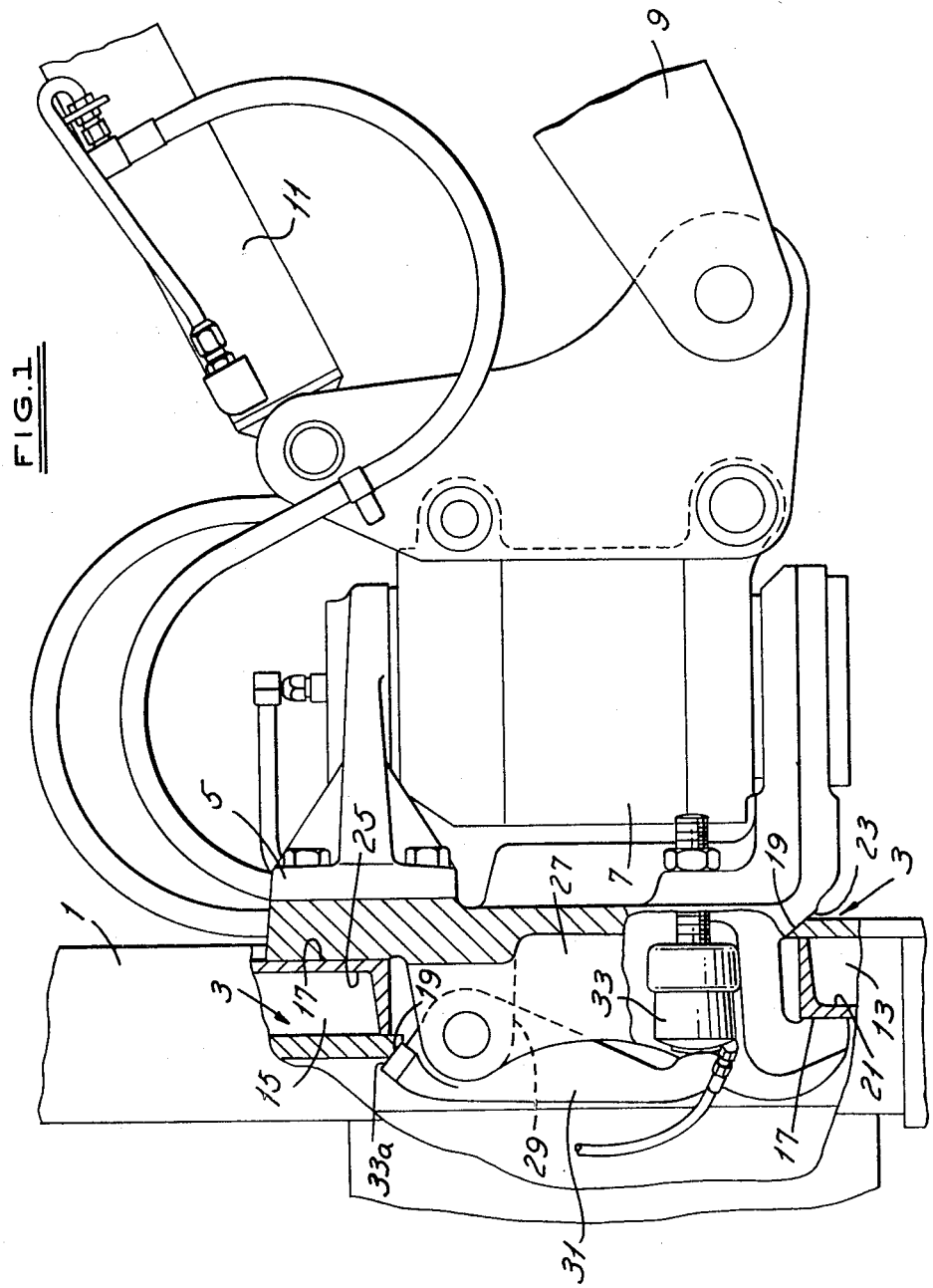
FIG. 1 is a side elevation of a portion of a backhoe, portions being broken away and other portions shown in vertical section.

FIG. 1 shows a part of an adjustable offset backhoe mounted at the rear of a tractor. A backhoe frame 1 is fixed to the rear of the tractor and has a transversely extending slideway 3. A carriage 5 is slidable on the slideway between one side of the tractor and the other side. A swing motor 7 is rotatably mounted on the carriage 5 in a usual manner and carries a conventional boom 9 and lift ram 11 of the backhoe. When fluid under pressure is admitted to the motor 7, the latter rotates about a vertical axis to swing the boom 9.

The slideway 3 comprises parallel and vertically spaced apart first and second sections 13 and 15. Each section has a vertical surface 17 and a surface 19 inclined to the vertical. The carriage has a vertical surface 21 corresponding to the vertical surface 17 of the first section 13, and an inclined surface 23 corresponding to the surface 19 of the first section 13. The carriage has also a vertical surface 25 corresponding to the vertical surface 17 of the section 15.

The carriage 5 has at opposite sides rearwardly extending flanges 27 and between the flanges a pair of brackets 29. A pair of levers 31 are respectively pivotally mounted between each flange 27 and adjacent bracket 29. Each lever has at its upper end an inclined surface 33a which corresponds with the inclined surface 19 of the second section 15. The lower end of each lever is engaged by the piston of a hydraulic actuator 33 mounted on the carriage 7.

When pressure is released from the actuators 33, the surfaces 33a of the levers are no longer forced against the inclined surfaces 19. Consequently the frictional force between the carriage 7 and the slideway 3 is a function of the weight of the backhoe and carriage. The frictional force is not sufficient to prevent movement of the carriage along the slideway, which may be accomplished by When pressure is admitted to the actuators 33, the surfaces 33a of the levers are forced against the inclined surfaces 19 of the upper section 15. This has two effects: firstly it forces the carriage 7 downwardly; and secondly it draws the vertical surface 25 of the carriage firmly against the vertical surface 17 of the upper section. When the carriage is forced downwardly, the inclined surface 23 of the carriage tends to slide along the inclined surface 19 of the lower section 13. This movement draws the vertical surface 21 on the carriage firmly against the vertical surface 17 of the lower section. Consequently when pressure is admitted to the actuators 33, the carriage is clamped to the slideway sufficiently tightly to resist displacement during operation of the backhoe.

FIG. 3 shows a modification in which the hydraulic actuators are replaced by simple bolts 35. The bolts project through threaded holes in the carriage to engage the lower ends of the levers 31. When they are screwed in one direction, the levers are forced to clampingly engage the slideway 3 and clamp the carriage. The bolts are prevented from inadvertently becoming unscrewed by lock nuts 37. Apart from replacement of the actuators 33 by the bolts 35, the arrangement shown in FIG. 3 is identical with that in FIGS. 1 and 2. The force exerted by the actuators 33 on the slideway 3 is augmented by the mechanical advantage derived from the levers.

Figure 4:
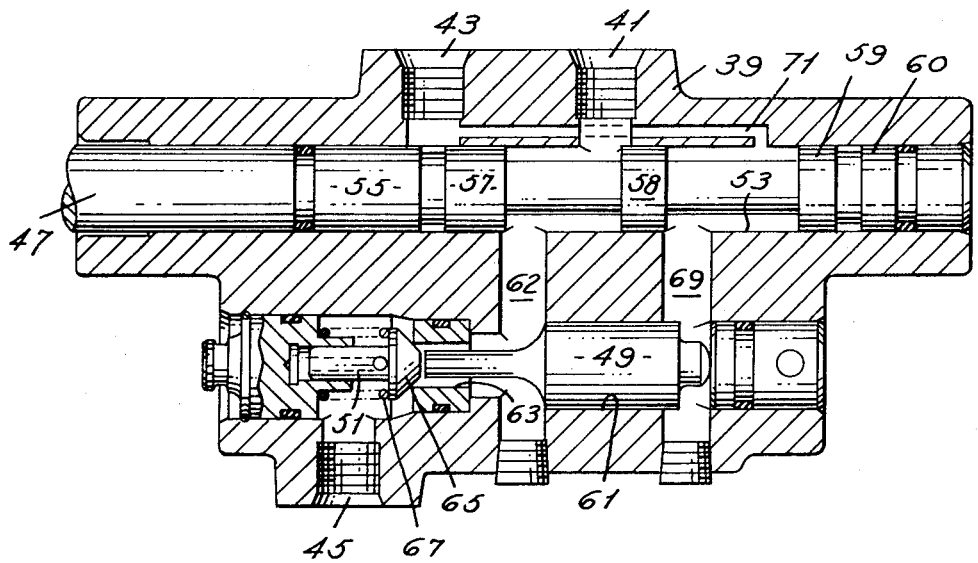
FIG. 4 is a longitudinal section through a hydraulic control valve assembly showing the valve positioned for actuating the carriage clamps.
Figure 5:
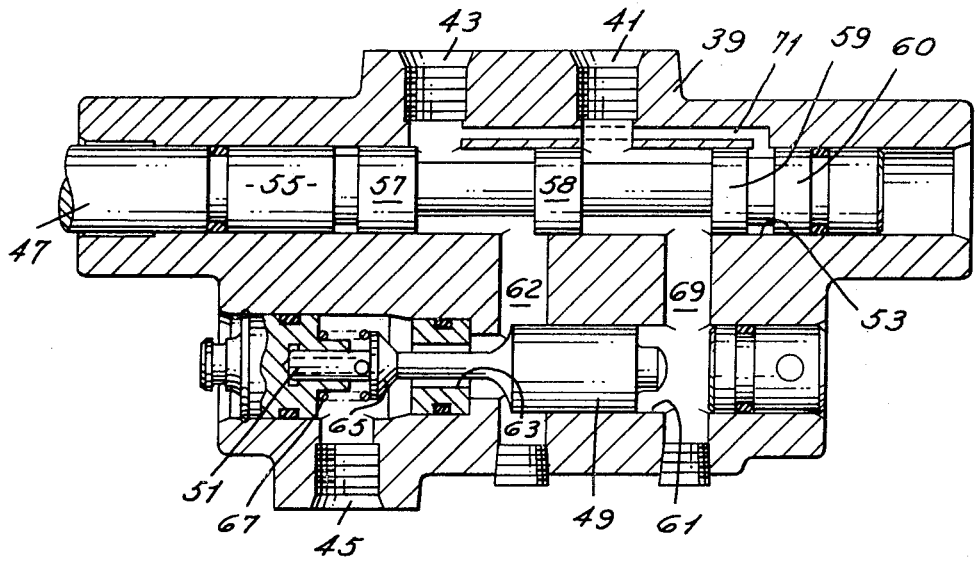
FIG. 5 is a view similar to FIG. 4 showing the valve positioned for releasing the clamps to permit carriage movement.

The valve assembly for controlling the admission of liquid to the actuators 33 is more or less conventional and is shown in FIGS. 4 and 5. FIG. 4 shows the position of the various valve members of the assembly when the carriage 5 is clamped to the slideway; and FIG. 4 the position of the valve members when the carriage 5 is free to move along the slideway.

The valve assembly has a valve housing 39 having an inlet 41 from the hydraulic pump of the tractor, an outlet 43 to the sump for the pump, and an outlet 45 to the clamp actuators. The valve assembly includes also three valve members 47, 49 and 51. The valve member 47 is manually controlled by the operator, is slidable in a bore 53 in the housing, and has lands 55, 57, 58, 59 and 60. The valve member 49 is slidable in a bore 61 and is operative to move the valve member 51 off its seat. The latter member 51, is a spring loaded check valve that controls the flow of liquid to the actuators 33.

When the valve members are in the clamp position shown in FIG. 4, liquid from the pump flows through the inlet 41 to the space between the lands 57 and 58 and then through a passage 62 to a port 63 controlled by a head 65 of the valve 51. The valve 51 which is a spring loaded check valve, opens when the force on the right hand side of the head 65 of the valve is greater than the force on the left hand side of the head 63. The force on the left hand side of the head 63 is due partly to the pressure in the actuators 33 and partly to the spring 67. When the manual valve 47 is in the position shown, the force on the right hand side of the head 65 is greater than on the left hand side and consequently the check valve 51 opens to admit fluid to the actuators 33 to clamp the carriage.

The liquid in the passage 62 also acts on the left hand side of the valve member 49 to force it to the right away from the head 65 of the check valve 51. The liquid at the right hand side of the valve member 49 is exhausted through a passage 69, the space between the lands 58 and 59 and a passage 71 communicating with the outlet 43. The land 58 isolates the inlet 41 from the passages 69 and 71.

The valve member 47 is moved to the left to the position shown in FIG. 5 to release the pressure in the actuators 33. When the valve member 47 is in this position liquid from the pump flows through the inlet 41 to the space between the lands 58 and 59, and thence through the passage 69 to act on the right hand side of the valve member 49. The member 49 is therefore moved to the left and engages the head 65 of the valve member 51 to move it off its seat and thereby open the port 63. The pressure in the actuators is thus released through the port 63 passage 61 the space between the lands 57 and 58 and the outlet 43. The inlet 41 is cut off from the passage 71 by the land 59.

Thus, by manually placing the valve member 47 in the position shown in FIG. 4, the carriage 5 may be clamped in any adjusted position along the slideway 3. Upon moving the valve member 47 to the position indicated in FIG. 5, the carriage 5 is released for movement to a new position along the slideway.

We claim:

1. In a sideshift backhoe, a frame adapted to be mounted on a tractor and having a transversely extending slideway, the slideway having upper and lower parallel rail sections each provided with a vertical and an inclined surface, a carriage mounted for sliding movement along the slideway and having vertical surfaces for engagement with the vertical surfaces of the rail sections and an inclined surface for engagement with the inclined surface of the lower rail section, a lever type clamp pivotally mounted on the carriage for clamping one end of said clamp against the inclined surface of the upper rail to force the vertical surfaces and inclined surface of the carriage against the corresponding surfaces of the rails, and expansible means extending between the carriage and the other end of the clamp for rotating said clamp into clamping engagement with the upper rail.

2. In a sideshift backhoe as claimed in claim 1, the lever being mounted for rotation on a horizontal pivot carried by the carriage.

3. In a sideshift backhoe as claimed in claim 2, the expansible means comprising a hydraulic cylinder.

4. In a sideshift backhoe as claimed in claim 2, the expansible means comprising a bolt threadedly engaged in the carriage and capable of being screwed against the clamp.

* * * * *